INVENTOR
KITTY ZAIDENER

FIG. 3

May 4, 1965 K. ZAIDENER 3,181,452
COOKING BY MEANS OF ELECTRICITY
Filed May 22, 1963 8 Sheets-Sheet 4

INVENTOR
KITTY ZAIDENER

BY
*Wenderoth, Lind & Ponack*

ATTORNEYS

May 4, 1965

K. ZAIDENER 3,181,452

COOKING BY MEANS OF ELECTRICITY

Filed May 22, 1963

INVENTOR
Kitty Zaidener
BY Wenderoth
Lind and Ponack, ATTORNEYs

United States Patent Office 3,181,452
Patented May 4, 1965

3,181,452
COOKING BY MEANS OF ELECTRICITY
Kitty Zaidener, 414 The White House, Albany St.,
London, England
Filed May 22, 1963, Ser. No. 284,282
Claims priority, application Great Britain, Apr. 7, 1960,
12,479/60; May 31, 1960, 19,301/60
15 Claims. (Cl. 99—332)

This application is a continuation-in-part of application Serial No. 100,254, filed April 3, 1961, now abandoned.

This invention relates to cooking by means of electricity and, more specifically, to an apparatus for cooking sausages.

It is an object of the invention to provide a method and an apparatus for cooking sausages safely and quickly, and with a minimum of effort, and which will produce a cooked sausage of attractive appearance. The apparatus is principally intended for the final cooking, i.e. in effect reheating, of pre-cooked sausages of the kind known as frankfurters.

Apparatus according to the present invention comprises an open-topped water container for receiving a sausage, a support on which said container is mounted, a lower contact electrically connected to one pole of an electrical circuit arranged in said container near the bottom thereof, an upper contact electrically connected to the opposite pole of said electrical circuit arranged above the container, a carrier on which said upper contact is mounted for movement through the top of the container from a retracted position outside the container to a working position within the container where it is adapted to contact the top end of a sausage within the container, means mounted on said carrier and adapted to be coupled with said upper contact for moving said upper contact into and out of said container and releasing said carrier for movement relative to said support, a hood on said carrier for shielding said upper contact and closing the apparatus during a cooking operation, said carrier being movably mounted for moving said upper contact away from the top of said container when the upper contact has been withdrawn, and timer means coupled to said upper contact moving means for energising said upper contact moving means for retracting said upper contact from said container and for de-energising said electrical circuit and for permitting said carrier to move away from said container after a cooking time has elapsed.

The upper contact may be secured to the bottom end of a rod which is mounted on the carrier for vertical sliding movement; the vertical movement may be controlled by means of an electric motor, or a solenoid.

Suitably, said water container comprises an open-ended glass tube mounted in a water reservoir tank to provide a substantial quantity of water for repeated cooking operations.

Embodiments of the invention will now be described, by way of example, with reference to the accompanying drawings, in which.

Referring to FIGURES 1 to 4 of the drawings, the machine has a sheet metal casing 10 and includes a hood 11 which is movable inwardly to uncover the open top of a water-containing glass tube 12. A lower dished contact 13 is fixed in the base of the tube and a metal stem 14 extends through the tube base to engage a contact 15 in the body of the machine. An upper dished contact 16 is secured to the bottom end of the inner stem 17 of a telescopic rod 18. The rod 18 is secured to an insulated bracket 19 which is slidably mounted on a generally upright carrier 20. The carrier is mounted on a horizontal pivot 21 and at its upper end carries the hood 11 which shrouds the upper contact 16. A hand lever 22 is also mounted on pivot 21 and carries a transverse bar 23 which is arranged to engage the carrier 20 and a stop 24. In the position shown in the drawings, the carrier weight is also opposed by compression springs 25 on twin pivotal rods 26. The rods 26 pass through swivel blocks 27 mounted on the carrier 20. The lever 22 is spring-urged upwardly and is connected by an angled arm 28 and a spring 29 to a clockwork timer 30. The timer is mounted on the side of a fixed shield 31 for the tube and is provided with a presetting dial 32.

Figure 1:
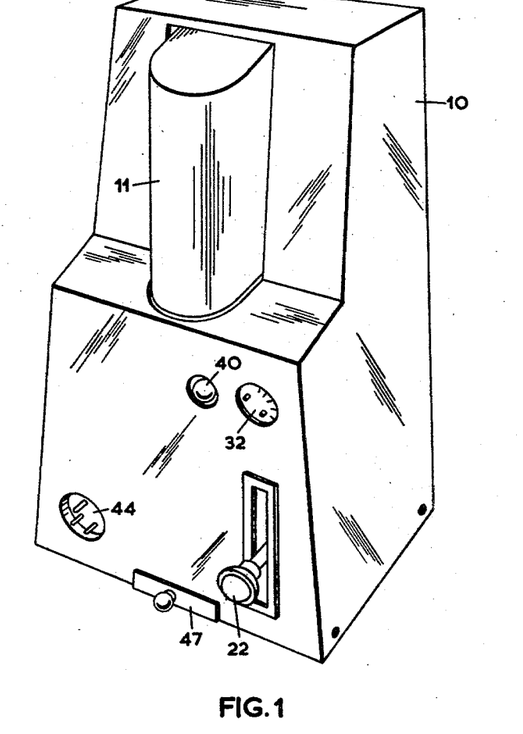
FIGURE 1 is a perspective view showing one form of sausage cooking machine.
Figure 2:
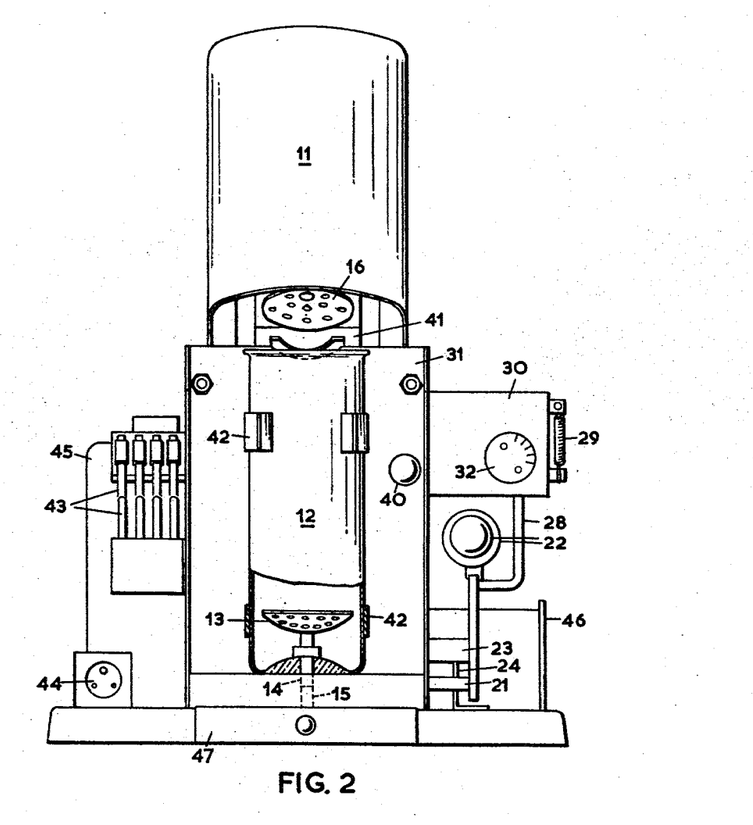
FIGURE 2 is a front elevation showing the machine with its casing removed.
Figure 3:
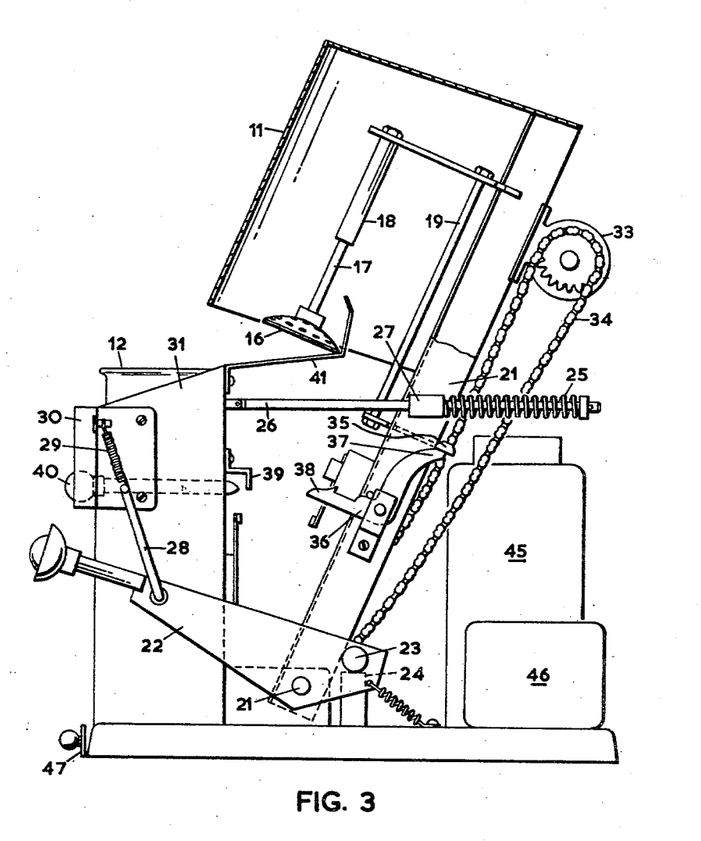
FIGURE 3 is a side elevation corresponding to FIGURE 2.

An electric motor 33 is mounted on the rear face of the carrier 20 and has a chain connection 34 with a base projection 35 of the bracket 19. A bell-crank lever 36 is pivotally mounted on the carrier and has a first finger 37 arranged to engage the projection 35 and a second finger 38 arranged to engage with a catch 39 secured to shield 31. An emergency plunger 40 is provided for effecting direct disengagement between finger 38 and catch 39.

A drip chute 41 extends rearwardly from the top of the shield 31 to carry water drops from contact 16 to the tube 12 which is held in position by spring clips 42.

Figure 4:
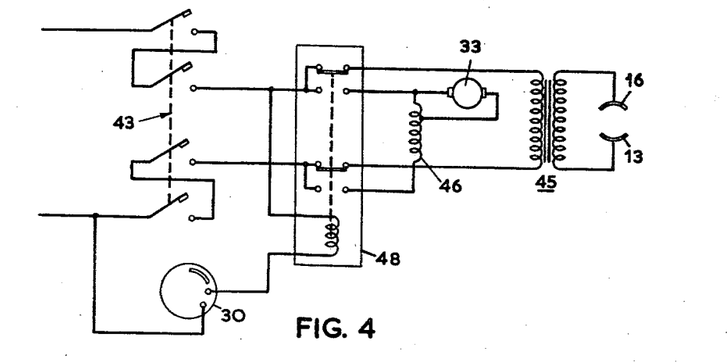
FIGURE 4 is a diagram illustrating the electrical circuit of the machine.

A multiple contact switch 43 is mounted on the shield 31 and the carrier 20 and an electrical input plug 44 for mains current is mounted on the body of the machine. A first transformer 45 is provided to supply a low amperage current of the order of 500 volts to the contacts 13 and 16, and a second transformer 46 is provided to supply current for the motor 33. The transformers, and particularly transformer 46, must be of sufficient capacity to prevent over-heating due to repeated cooking operations even when the water becomes contaminated by fat from the sausages and so increases the current consumed during each operation. A drawer 47 is also provided.

In operation, the timer is set to a reading of, say, five seconds, and a sausage is placed in the tube 12 which is partially filled with water. The lever 22 is then pressed downwardly to move the carrier forwardly to an upright position where it is held by the catch 39. In this position the hood 11 completes the enclosing of the working parts within the casing 10. The finger 37, having moved forwardly, allows the upper contact 16 to fall downwardly to engage the top of the sausage below water level. The lever action also starts the timer 30 and the carrier movement also closes the switch 43. The cooking operation then takes place for the predetermined period of five seconds, and at the end of this period the timer, through a suitable relay switch 48, cuts off current to the contacts and energises the electric motor to raise the upper contact. At the end of the raising movement the finger 37 is actuated by the projection 35 to free finger 38 and catch 39 and so allow the carrier to fall backwardly with the top contact and the hood 11, thus opening the switch 43 and providing access to the top of the tube. The cooked sausage which floats in the water in the tube can then be removed.

It will be appreciated that the operation of the apparatus is completely automatic after actuation of the handle. Also, the apparatus has a high degree of safety as it is virtually closed during the period when the contacts are energised.

If it is required to stop the cooking operation before the process is complete, the emergency plunger 40 may be actuated to release finger 38 and to energise the motor to raise the top contact and allow the carrier to fall back.

Figure 5:
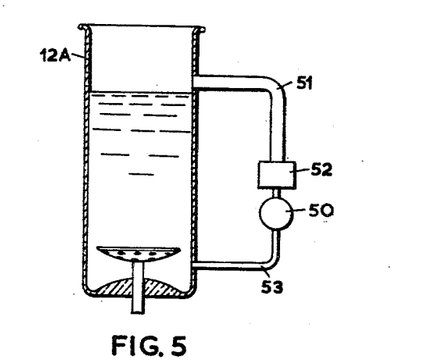
FIGURE 5 is a fragmentary view showing an alternative construction of part of the machine.

After cooking a number of sausages, the water in tube 12 may become contaminated and, at intervals, the tube should be removed and can be replaced while being refilled with clean water. To reduce the frequency of tube replacement, a filtering system such as shown in FIGURE 5 may be employed. In this system a pump 50 draws water from tube 12A through a large bore pipe 51 and a filter 52 and returns the filtered water through pipe 53 to the tube. The filter may be replaceable or removable for cleaning, after a period of use. The filtering system also acts to cool the cooking water and, to promote the cooling effect, a reservoir tank may be included in the system. Alternatively, fresh water may be continuously fed to the tube, the excess water with contaminating material being passed to waste.

Modifications may be made without departing from the scope of the invention. For example, instead of the motor 33 a weight, which is raised on closing the machine and is released by means of a solenoid mounted on the pivotal arm, may be provided to effect raising of the top contact. Also, the machine may be provided on a mobile canteen having a current generator; in this case the transformer arrangement may be modified.

Referring now to FIGURES 6 to 9 of the drawings, the machine has a sheet metal casing 110 and includes a hood 111 which is slidable inwardly to uncover the open top of a water-containing glass tube 112 which is also open at the bottom.

Figure 6:
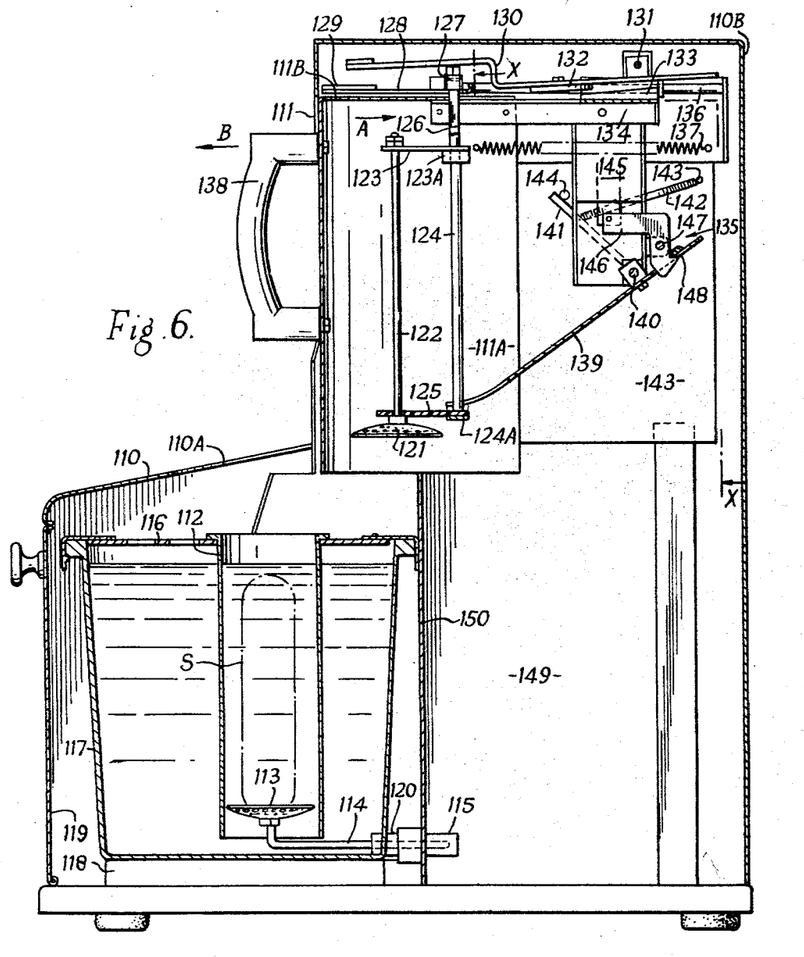
FIGURE 6 is a sectional elevation showing an alternative form of sausage cooking machine.

A lower dished contact 113 is fixed at the bottom of the tube and has a metal supporting stem 114 which extends through the tube bottom and horizontally to engage electrical contact 115 in the body of the machine.

The tube 112 is supported by a plate 116 which extends across the top of and strengthens a water containing reservoir tank 117. The tank is supported on a base 118 and is removable when a door 119 in the casing is opened. The stem 114 of the lower contact extends through a sealing block 120 carried by the wall of the tank 117.

An upper dished contact 121 is secured to the bottom of a vertical rod 122 and as described with reference to FIGURES 1 to 4, the lower contact 113 is connected to one pole of the electrical circuit and the upper contact 121 is connected to the opposite pole of the circuit. The top of rod 122 is secured to a triangular plate 123 which carries a pair of sleeves 123A slidable in guide rods 124. The rods 124 are supported on a transverse bar 124A secured to the hood sides 111A and extend upwardly to the hood roof 111B. The contact rod 122 extends through a triangular guide plate 125 which is secured to the bar 124A. A short rod 126 extends upwardly from plate 123 and is provided at the top with a pair of pivotal wings 127. The wings are spring-urged apart and are arranged to coact with a slot 128 in a fixed upper plate 128A and a pair of guides 129 which flank the left-hand end of the slot 128.

A release lever 130 is mounted on a stationary pivot 131 and carries an eccentric disc 132. The disc acts as an adjustable stop for a wedge-faced member 133 secured to a carrier plate 134 which also carries the hood 111. A release mechanism 135 is also carried by the plate 134.

The carrier plate, and thus the hood are slidably mounted on a pair of horizontal guide rods 136 and are urged in the direction of arrow A by a pair of tension springs 137 which are attached to the hood and are anchored on to the machine chassis. A handle 138 is provided for manually moving the hood in the direction of arrow B.

Under the release mechanism 135 an operating lever 139 is pivotally mounted on a shaft 140. The shaft has a transverse arm 141 which is urged clockwise by a tension spring 142 anchored at 143 on the machine chassis. An adjustable stop 144 for the arm 141 is also mounted on the chassis. A solenoid 145 is carried by the plate 134 and the solenoid is arranged to actuate an angled finger 146. The finger 146 is freely mounted on a pivot 147 to coact with a slot 148 in lever 139.

The transformer and other electrical equipment is accommodated in the area 149 between partition 150 and rear wall 110B of the casing.

A counter may be mounted on the casing to be actuated by hood movement and so record the number of cooking operations.

Figure 7:
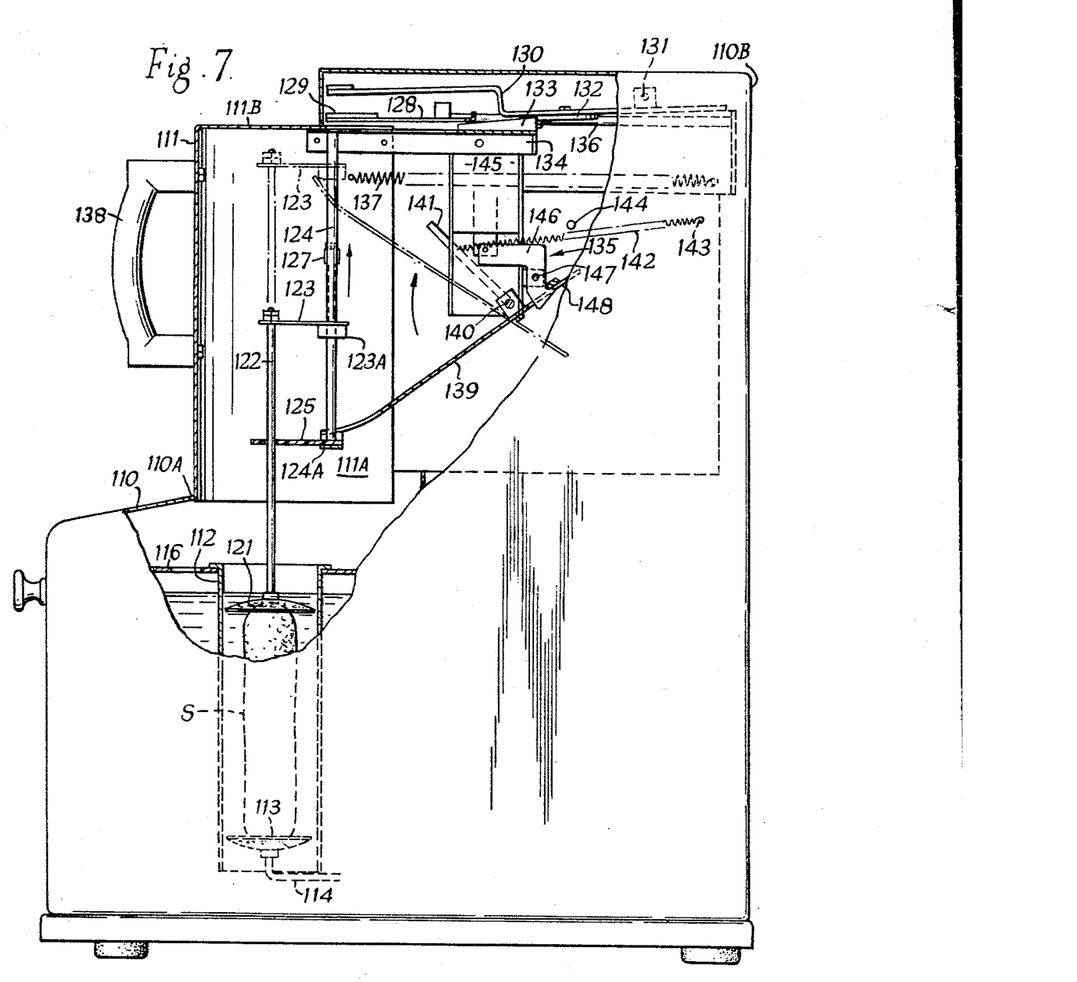
FIGURE 7 corresponds to FIGURE 6 but shows the machine in the closed position.
Figure 8:
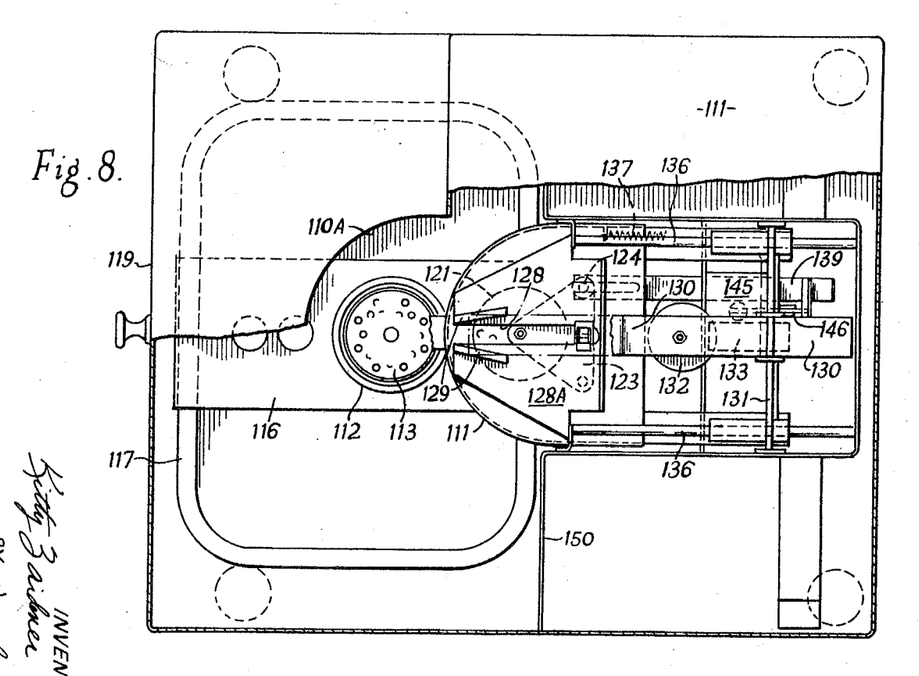
FIGURE 8 is a plan view, partly in section, corresponding to FIGURE 6.
Figure 9:
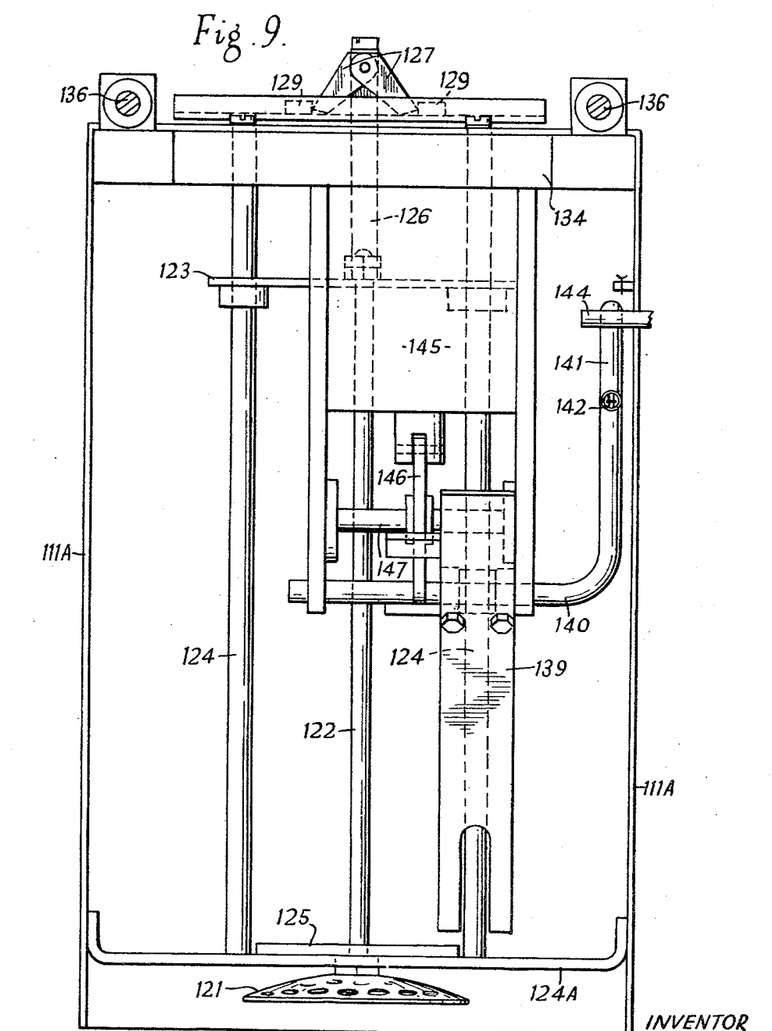
FIGURE 9 is a section on the line X—X in FIGURE 6.

In operation, with the machine in the state shown in FIGURE 6, a sausage S is placed in the tube 112 and the handle 138 is pulled to move the hood in the direction of arrow B. When the top of rod 126 reaches the guides 129 the wings 127 are folded inwardly and on reaching the outermost position the folded wings allow the rod top to drop through the slot 128 whereupon the contact 121 falls to contact the top of the sausage S, as shown in FIGURE 7. As the hood reaches the outermost position an electric switch (not shown) is closed to energise the contacts 113 and 121. It will be noted that the curved face of the hood is closely adjacent the opening 110A in the casing to close the machine safely when the contacts are energised. Cooking is then effected and after a prescribed time a clockwork timer closes a switch to energise the solenoid 145 whereupon the finger 146 is moved clockwise to disengage from slot 148 and free the lever 139. Under the action of spring 142 on arm 141 the lever 139 is moved rapidly clockwise to the broken-line position shown in FIGURE 7 and, engaging under plate 123, raises the contact 121. Consequently, the rod 126 is moved rapidly upwardly and its top end passes through slot 128 to strike lever 130 which is shifted in a clockwise direction whereupon disc 132 is raised to free block 133. Upon block 133 being freed the springs 137 draw the hood and carrier plate back in the direction of arrow A thus de-energising the contacts and exposing the open top of the tube 112 so that the cooked sausage can be removed through opening 110A.

As the release mechanism 135 returns to the position shown in FIGURE 7 the arm 141 engages the stop 144 to move the lever 139 counter-clockwise so that the finger 138 re-engages with slot 149 to hold the lever in the tensioned position.

During cooking operations the water in reservoir tank 117 circulates through the tube 112 which may have perforated walls and a substantial number of operations may be completed before the water must be changed due to contamination. Water change is, however, simple due to the tank being easily removable and a spare tank may be provided to permit cleaning during continued operation of the machine.

Springs or rubber cushions may be provided to reduce the effect of impact at the termination of the movements of the carrier and hood.

I claim:

1. Apparatus for cooking sausages, comprising an open-topped water container for receiving a sausage, a base on which said container is mounted, a lower contact electrically connected to one pole of an electrical circuit arranged in said container near the bottom thereof, an upper contact electrically connected to the opposite pole of said electrical circuit arranged above the container, a generally upright carrier on which said upper contact is mounted for movement through the top of the container from a retracted position outside the container to a working position within the container where it is adapted to contact the top end of a sausage within the container, means mounted on said carrier and coupled with said upper contact for moving said upper contact into and out of said container and releasing said carrier for movement relative to said base, said carrier being pivotally mounted on said base for pivoting said upper contact away from the top of said container when the upper contact has been withdrawn, and timer means coupled to said upper contact moving means and said carrier and said electrical circuit for deenergising said electrical circuit and energising said upper contact moving means for retracting said upper contact from said container and for permitting said carrier to pivot on said base away from said container after a cooking time has elapsed.

2. Apparatus according to claim 1, in which said timer means comprise a clock-work timer.

3. Apparatus according to claim 1, in which a hand lever is mounted on said carrier to effect pivotal movement of said carrier to bring the upper contact into position above said open-topped container.

4. Apparatus according to claim 1, in which said upper contact moving means is an electric motor mounted on said carrier and arranged to effect raising of said upper contact.

5. Apparatus according to claim 1, in which an actuator acting on said means for releasing said carrier is provided for emergency operation of said releasing means.

6. Apparatus as claimed in claim 1, in which said upper contact is mounted at the lower end of a generally upright telescopic rod mounted on said carrier.

7. Apparatus as claimed in claim 1, in which means connected to said container are provided for removing contaminating material from the cooking water.

8. Apparatus according to claim 7, in which said means for removing contaminating material comprise a pump arranged to draw water from the top part of said container through a filter before returning the filtered water to the bottom part of said container.

9. Apparatus comprising an open-topped water container for receiving a sausage, a support on which said container is mounted, a lower contact electrically connected to one pole of an electrical circuit arranged in said container near the bottom thereof, an upper contact electrically connected to the opposite pole of said electrical circuit arranged above the container, a carrier on which said upper contact is mounted for movement through the top of the container from a retracted position outside the container to a working position within the container where it is adapted to contact the top end of a sausage within the container, means mounted on said carrier and coupled with said upper contact for moving said upper contact into and out of said container and releasing said carrier for movement relative to said support, a hood on said carrier for shielding said upper contact and closing the apparatus during a cooking operation, said carrier being movably mounted for moving said upper contact away from the top of said container when the upper contact has been withdrawn, and timer means coupled to said upper contact moving means for energising said upper contact moving means for retracting said upper contact from said container and for de-energising said electrical circuit and for permitting said carrier to move away from said container after a cooking time has elapsed.

10. Apparatus according to claim 9, in which said means for moving said upper contact out of said container are solenoid actuated.

11. Apparatus according to claim 9, in which holding means are provided for holding said carrier in a cooking position and said upper contact is mounted on a support including a vertical rod which releases said holding means when said upper contact is retracted.

12. Apparatus for cooking sausages, comprising an open ended tubular water container for receiving a sausage, a water reservoir tank in which said container is mounted, a lower contact electrically connected to one pole of an electrical circuit arranged in said container near the bottom thereof, an upper contact electrically connected to the opposite pole of said electrical circuit arranged above the container, a carrier on which said upper contact is mounted for movement through the top of the container from a retracted position outside the container to a working position within the container where it is adapted to contact the top end of a sausage within the container, means mounted on said carrier and coupled with said upper contact for moving said upper contact into and out of said container and releasing said carrier for movement relative to said support, a hood for shielding said upper contact and closing the apparatus during a cooking operation, said carrier being movably mounted for moving said upper contact away from the top of said container when the upper contact has been withdrawn, and means coupled to said upper contact moving means for energising said upper contact moving means for retracting said upper contact from said container and for de-energising said electrical circuit and for permitting said carrier to move away from said container after a cooking time has elapsed.

13. Apparatus according to claim 12, in which a plate is mounted on and extends across the top of said reservoir tank, said water container comprises a glass tube, an outer lip is formed at the upper end of the tube, and the tube is suspended from said plate by said lip engaging around an opening in the plate through which the tube extends.

14. Apparatus according to claim 12, in which said reservoir tank is easily removable from the apparatus, and further having an external contact on said reservoir electrically connected to said lower contact, and a fixed electrical contact on the apparatus engaged by said external contact when the reservoir is in its operative position.

15. Apparatus according to claim 9, in which a heavy duty step-up transformer is included in said circuit to feed to said contacts a voltage greater than the supply current fed to the apparatus.

References Cited by the Examiner

UNITED STATES PATENTS

| 1,044,201 | 11/12 | Lincoln | 99—253 X |
| 1,919,050 | 7/33 | Warner | 99—358 |
| 2,075,474 | 3/37 | Scutt | 99—358 |
| 2,212,794 | 8/40 | Salinski | 99—358 |
| 2,474,390 | 6/49 | Aff | 99—358 X |
| 2,568,792 | 9/51 | Cripps | 99—335 |
| 2,630,062 | 3/53 | Litt | 99—336 X |

FOREIGN PATENTS

| 1,106,045 | 5/61 | Germany. |

ROBERT E. PULFREY, *Primary Examiner.*

LAWRENCE CHARLES, *Examiner.*